US009384270B1

(12) United States Patent
Jay et al.

(10) Patent No.: US 9,384,270 B1
(45) Date of Patent: Jul. 5, 2016

(54) ASSOCIATING USER ACCOUNTS WITH SOURCE IDENTIFIERS

(71) Applicant: Amazon Technologies, Inc., Reno, NV (US)

(72) Inventors: Jon Russell Jay, Mercer Island, WA (US); Donald L Kaufman, Kirkland, WA (US); Joseph Daniel Sullivan, Seattle, WA (US); Brock Aaron Judkins, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 85 days.

(21) Appl. No.: 13/916,546

(22) Filed: Jun. 12, 2013

(51) Int. Cl.
*G06F 17/30* (2006.01)
*G06Q 20/40* (2012.01)

(52) U.S. Cl.
CPC .......... *G06F 17/30705* (2013.01); *G06Q 20/40* (2013.01); *G06F 17/30286* (2013.01)

(58) Field of Classification Search
CPC ............ G06F 17/30286; G06F 21/552; G06F 17/30705; G06Q 20/40
USPC ............................................ 707/737; 705/1.1
See application file for complete search history.

(56) References Cited

U.S. PATENT DOCUMENTS

| 5,894,511 | A * | 4/1999 | Jordan | H04M 15/00 379/114.14 |
|---|---|---|---|---|
| 5,956,024 | A * | 9/1999 | Strickland | G06Q 30/02 715/717 |
| 6,014,647 | A * | 1/2000 | Nizzari | G06Q 20/10 705/39 |
| 6,192,123 | B1 * | 2/2001 | Grunsted | H04M 3/42 379/201.01 |
| 6,341,160 | B2 * | 1/2002 | Tverskoy | H04M 1/65 379/88.13 |
| 6,553,113 | B1 * | 4/2003 | Dhir | H04M 3/493 379/265.02 |
| 6,996,227 | B2 * | 2/2006 | Albal | H04M 1/2745 379/121.05 |
| 7,088,809 | B1 * | 8/2006 | Gits | H04L 65/1053 379/201.01 |
| 7,386,510 | B2 * | 6/2008 | Degen | G06Q 20/40 379/114.14 |
| 7,581,112 | B2 * | 8/2009 | Brown et al. | 713/182 |
| 7,839,987 | B1 * | 11/2010 | Kirchhoff | H04M 3/42195 379/142.01 |
| 8,234,302 | B1 * | 7/2012 | Goodwin et al. | 707/783 |
| 8,255,304 | B1 * | 8/2012 | Lorenzo | G06Q 40/00 705/35 |
| 8,300,780 | B1 * | 10/2012 | Davis | H04M 1/64 379/88.19 |
| 8,867,732 | B1 * | 10/2014 | Hoen, IV | G06Q 30/01 379/111 |
| 8,923,504 | B1 * | 12/2014 | Bracco | H04M 3/5183 379/265.12 |
| 8,958,542 | B1 * | 2/2015 | Kaufman | H04M 3/00 379/265.11 |
| 9,077,828 | B1 * | 7/2015 | Koster | H04N 1/00334 |
| 9,231,942 | B1 * | 1/2016 | Pinkerton | H04L 63/107 |
| 2001/0040949 | A1 * | 11/2001 | Blonder | H04M 15/08 379/144.01 |

(Continued)

FOREIGN PATENT DOCUMENTS

WO  WO 2007/023483  *  3/2007  ............. G06Q 40/00

*Primary Examiner* — Phuong Thao Cao
(74) *Attorney, Agent, or Firm* — Athorus, PLLC

(57) ABSTRACT

This disclosure describes a system for associating user accounts with source identifiers included in communication requests received from users of those user accounts and using that information to later identify potential user accounts. For example, when a user contacts a support network, such as a call center, the source identifier (e.g., telephone number) may be identified. Once the user initiating the communication request is verified and the corresponding user account identified, the source identifier may be associated with the identified user account. By establishing and storing a relationship between the source identifier and the verified user account, if the user later again initiates a communication request that includes the same source identifier, that user's user account may be quickly identified to the agent, thereby simplifying verification.

21 Claims, 7 Drawing Sheets

(56) References Cited

U.S. PATENT DOCUMENTS

| | | | |
|---|---|---|---|
| 2003/0099332 A1* | 5/2003 | Parsa | H04M 3/382 379/67.1 |
| 2003/0217005 A1* | 11/2003 | Drummond | G06F 3/023 705/43 |
| 2004/0039846 A1* | 2/2004 | Goss | H04L 29/06 709/248 |
| 2005/0013423 A1* | 1/2005 | Eversen | H04M 15/00 379/114.17 |
| 2005/0032527 A1* | 2/2005 | Sheha et al. | 455/456.1 |
| 2006/0062205 A1* | 3/2006 | Doherty | H04M 3/2218 370/352 |
| 2006/0156389 A1* | 7/2006 | Brown | G06F 21/552 726/5 |
| 2006/0188076 A1* | 8/2006 | Isenberg | H04M 3/385 379/88.02 |
| 2007/0061193 A1* | 3/2007 | Libonati | G06Q 30/0267 705/14.64 |
| 2008/0215961 A1* | 9/2008 | Altberg | H04L 12/14 715/205 |
| 2009/0119194 A1* | 5/2009 | Chau | G06Q 20/385 705/35 |
| 2009/0248543 A1* | 10/2009 | Nihalani | G06Q 30/02 705/26.1 |
| 2009/0281904 A1* | 11/2009 | Pharris | G06Q 20/102 705/17 |
| 2009/0307775 A1* | 12/2009 | Brown et al. | 726/23 |
| 2010/0104083 A1* | 4/2010 | Berman | H04M 3/4931 379/218.01 |
| 2010/0191646 A1* | 7/2010 | Smith | G06Q 20/102 705/40 |
| 2010/0211996 A1* | 8/2010 | McGeehan | G06F 21/316 726/4 |
| 2010/0216425 A1* | 8/2010 | Smith | 455/406 |
| 2010/0235276 A1* | 9/2010 | Smith | G06Q 20/04 705/40 |
| 2010/0291912 A1* | 11/2010 | Tafarrodi et al. | 455/419 |
| 2011/0038469 A1* | 2/2011 | Clark et al. | 379/130 |
| 2011/0110507 A1* | 5/2011 | Spiegel | 379/131 |
| 2011/0167440 A1* | 7/2011 | Greenfield | 725/25 |
| 2011/0178927 A1* | 7/2011 | Lindelsee | G06Q 20/40 705/44 |
| 2011/0258075 A1* | 10/2011 | Ciurea | G06Q 20/20 705/26.41 |
| 2011/0283347 A1* | 11/2011 | Bhuta | H04L 63/0807 726/9 |
| 2011/0287739 A1* | 11/2011 | Cajigas Bringas | H04L 63/18 455/410 |
| 2012/0066065 A1* | 3/2012 | Switzer | 705/14.53 |
| 2012/0173348 A1* | 7/2012 | Yoo | G06Q 20/10 705/16 |
| 2012/0221437 A1* | 8/2012 | Yoo | 705/26.41 |
| 2012/0284017 A1* | 11/2012 | Begeja et al. | 704/9 |
| 2012/0289188 A1* | 11/2012 | Marcus | G06Q 20/12 455/406 |
| 2012/0297484 A1* | 11/2012 | Srivastava | 726/23 |
| 2012/0320905 A1* | 12/2012 | Ilagan | H04L 65/1069 370/352 |
| 2013/0073423 A1* | 3/2013 | Allen et al. | 705/26.8 |
| 2013/0156171 A1* | 6/2013 | Springer | H04M 1/64 379/88.22 |
| 2013/0254857 A1* | 9/2013 | Bajenov | G06F 21/00 726/7 |
| 2013/0262475 A1* | 10/2013 | Barak et al. | 707/748 |
| 2013/0272514 A1* | 10/2013 | Dragushan | H04M 3/42195 379/210.01 |
| 2013/0336170 A1* | 12/2013 | Broadworth et al. | 370/260 |
| 2013/0347113 A1* | 12/2013 | Yu | G06F 21/577 726/24 |
| 2014/0057596 A1* | 2/2014 | Brill et al. | 455/410 |
| 2014/0067401 A1* | 3/2014 | Sanjeeva | G06F 17/30684 704/260 |
| 2014/0169230 A1* | 6/2014 | Arora | 370/260 |
| 2014/0188728 A1* | 7/2014 | Dheer et al. | 705/44 |
| 2014/0192969 A1* | 7/2014 | Brown | H04M 3/54 379/213.01 |
| 2014/0330563 A1* | 11/2014 | Faians | G10L 17/04 704/236 |
| 2014/0376705 A1* | 12/2014 | Layman | H04M 3/38 379/114.14 |
| 2015/0026786 A1* | 1/2015 | Alexander | H04L 63/1408 726/7 |

* cited by examiner

ASSOCIATING USER ACCOUNTS WITH SOURCE IDENTIFIERS

BACKGROUND

Many retailers, businesses, and other customer dependent entities often provide support networks, such as call centers, that allow customers to contact the entity. For example, many product manufacturers maintain call centers through which customers (e.g., businesses selling their products, customers using their products) can contact the company to obtain support. One of the difficulties with such support networks is in identifying the user or customer that is contacting the entity. For example, many support networks require customers to verify their identity by providing their name, mailing address, email address, etc. This can often be difficult for both the customer and the agent working in the support network due to the difficulty in spelling out the words necessary to complete verification.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
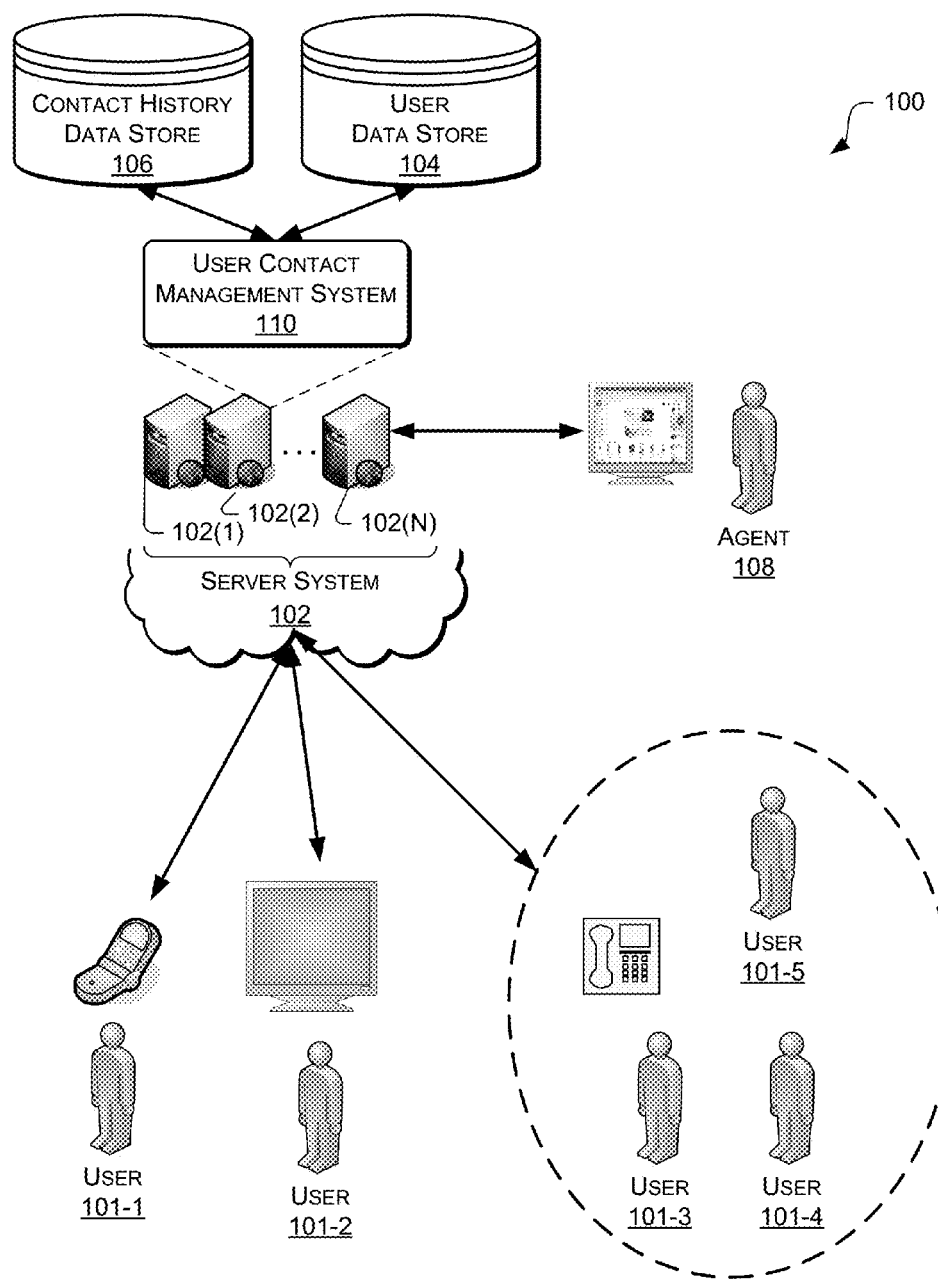
FIG. 1 is a block diagram illustrating an environment for associating a source identifier with a user account, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes a system for associating user accounts with source identifiers included in communication requests received from users of those user accounts. For example, when a user contacts a support network, such as a call center, the source identifier (e.g., telephone number) may be identified. Once the user initiating the communication request is verified and the corresponding user account identified, the source identifier may be associated with the identified user account. By establishing and storing a relationship between the source identifier and the verified user account, if the user later again initiates a communication request that includes the same source identifier, that user's user account may be quickly identified to the agent, thereby simplifying verification. Rather than the user having the specifically spell out any of the verification information, and the agent provide that information to a computing system, the potential matches may be provided and the appropriate one visually verified by the agent.

In some implementations, multiple users may initiate communication requests that include the same source identifier. In other implementations, the source identifier may be associated with multiple user accounts. When a subsequent communication request is received that includes the source identifier, user account information from one or more of the associated user accounts may be provided to an agent to simplify verification and identification of the user.

By maintaining a relationship between source identifiers and user accounts of user's that have initiated communication requests from the source identifiers, agents may be provided with a simplified list of potential user accounts for any future communication request that includes the source identifier. In some implementations, if there are multiple user accounts associated with a source identifier, only a certain percentage (e.g., the most recent, most frequent) may be provided to the agent for verification. In other implementations, user account information for all user accounts associated with a source identifier may be provided.

FIG. 1 is a block diagram illustrating an environment 100 for associating a source identifier with a user account, according to some implementations. As illustrated, one or more users 101-1, 101-2, 101-3, 101-4, 101-5 may initiate a communication request with a contact management system 110. For example a user 101-1 may utilize a portable device, such as a cell phone to initiate a communication request with the contact management system 110. A source identifier, such as the user cell's phone number may be included in the communication request. As utilized herein, a "source identifier" may be any identifying information, such as a phone number, coordinate locations, an internet protocol address, user identifier, unique identifier, and the like.

In other implementations, a user, such as user 101-2, may initiate a communication request using a computing device, such as a desktop or laptop computer. For example, the user may provide a source identifier (e.g., telephone number) to the server system 102 and request that an agent 108 contact that user at the source identifier. In still other implementations, multiple users 101-3, 101-4, 101-5 may, at different times, initiate communication requests that utilize the same source identifier. For example the users 101-3-101-5 may all initiate communication requests from an office and the source identifier included in each communication request may be the office telephone number.

The contact management system 110 may receive communication requests from users and search one or more of a user data store 104 and/or a contact history data store 106 for user accounts associated with the corresponding source identifier. As discussed further below, the user data store 104 may include user account information provided by users. Such information may include a billing telephone number (source identifier) or delivery coordinates (source identifier). The contact history data store 106 may include a list of associations between source identifiers and user accounts from prior communication requests. For example, each time a communication request is received and a user account identified and verified to correspond with a user initiating the communication request, an association between the source identifier and the user account may be included in the contact history data store.

Based on the identified user accounts, the contact management system 110 may provide a list of potential user accounts to an agent 108 for use in identifying the user initiating the communication request. For example, if fifteen prior communication requests have been received that included the source identifier of the current communication request, ten of those prior communication requests had come from user A and five of those communication requests had come from user B, the contact management system 110 may provide to the agent 108 user account information for both user A's user account and user B's user account.

The agent, upon receiving an identification of potential user accounts may then utilize the provided information to simplify the verification of the user initiating the current communication request. For example, the agent 108 may ask the user initiating the communication request to provide a name, e-mail address and/or shipping address. When the user provides the information, rather than the agent 108 having to type in the information they can visually scan the provided potential user account information for a match. If a match is identified, the user can be verified and the appropriate user account provided to the agent 108. If the user cannot be verified based on the provided potential user account information, the agent 108 may then resort to searching for the user's information using traditional techniques.

The contact management system 110 may also include and/or be implemented on a server system 102. The server system 102 may be local to an agent 108, remote from the agent 108, or any combination thereof. Likewise, the server system 102 may be configured to communicate over a network with the user devices, agent devices and/or a combination thereof.

As illustrated, the server system 102 may be implemented as one or more servers 102(1), 102(2), . . . , 102(N) and may, in some instances form a portion of a network-accessible computing platform implemented as a computing infrastructure of processors, storage, software, data access, and so forth that is maintained and accessible by components/device of the contact management system 110 via a network such as the Internet. The server system 102 does not require end-user knowledge of the physical location and configuration of the system that delivers the services. Common expressions associated for these remote server systems 102 include "on-demand computing," "software as a service (SaaS)," "platform computing," "network-accessible platform," "cloud services," "data centers," and so forth.

The network may utilize wired technologies (e.g., wires, USB, fiber optic cable, etc.), wireless technologies (e.g., RF, IR, NFC, cellular, satellite, Bluetooth, etc.), or other connection technologies. The network is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The server system 102 may also include a user data store 104, and/or a contact history data store 106. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The user data store 104 may include information about users, such as user account information, purchase history, browse history, etc. Any type of information may be stored in the user data store 104. For example, user profile information, such as attributes, name, address, gender, purchase history, social networks and/or friends with which the user interacts, and the like may be stored in the user data store 104. User information may be provided directly by users, such as when they become employed, collected from users when interacting with the contact management system 110, etc.

The contact history data store 106 may include a list of associations between source identifiers and user accounts of users verified to be initiating the communication requests. For example the association may include the user account identification, the date and time of the communication request, the number of times the user has initiated a communication request that included the source identifier, etc.

In some implementations, the user data store 104 and/or contact history data store 106 may include one or more CD-RW/DVD-RW drives, hard disk drives, solid-state drives, tape drives, or other storage devices that are utilized to store digital content and information. The server system 102, separately or together with the user data store 104 and contact history data store 106 may provide a contact history management system 110.

The organization and operation of the environment 100 described above is given as an example. In other implementations, the environment 100 may be arranged differently and operate differently than described above.

Figure 2:
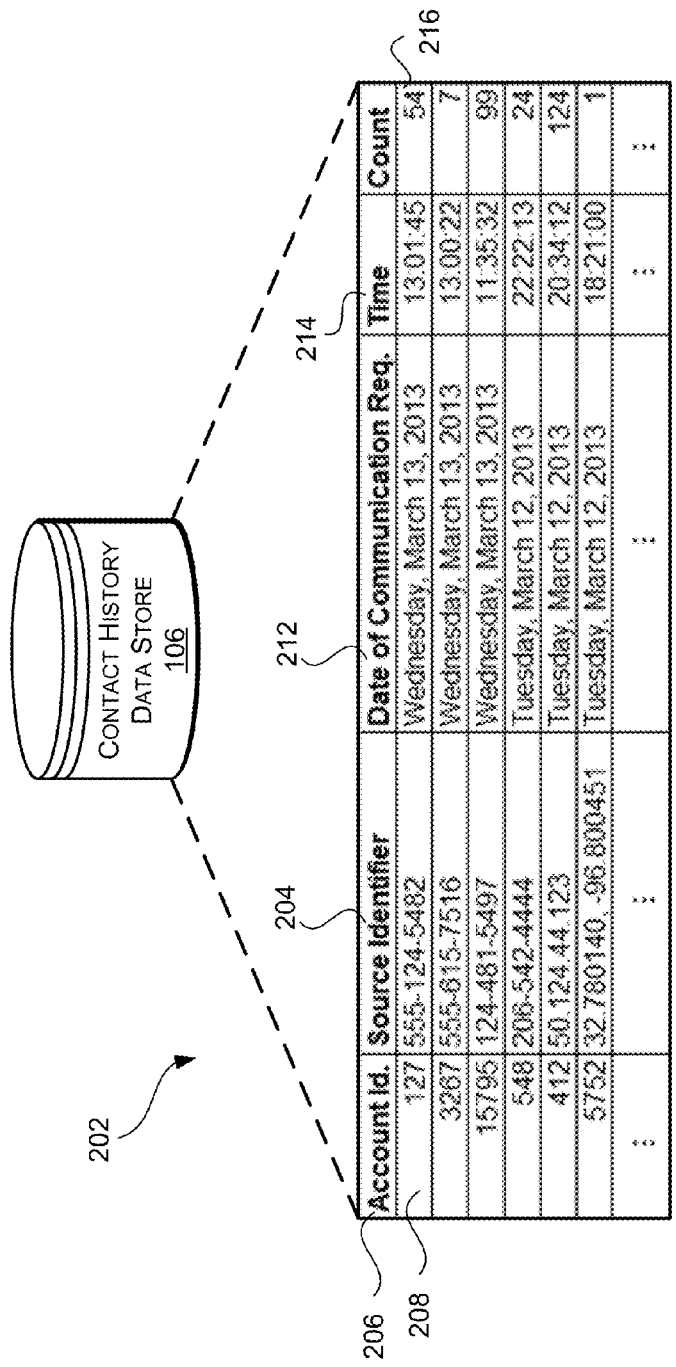
FIG. 2 is a block diagram illustrating information maintained in a contact history data store, according to some implementations.

FIG. 2 is a block diagram illustrating information maintained in a contact history data store 106, according to some implementations. The contact history data 106 store may maintain a list 202 of information identifying associations between source identifiers 204 and user accounts 206 that have initiated communication requests. As discussed further below, each time a communication request is initiated, the user verified and the corresponding user account identified, an association between the source identifier 204 included in the communication request and the user account 206 may be stored in the contact information data store 106. For example, as illustrated in FIG. 2, the user account with an account identifier of 127 208 has been associated with source identifier 555-124-5482 210. This association was stored because the user related to the user account with an identifier of 127 initiated a communication request from the source identifier 555-124-5482 and the agent 108 was able to verify the identity of the user.

In some implementations, additional information about the association, the user account 206 and/or the source identifier 204 may also be maintained in the contact history data store 106. For example, the date of the initiation of the communication request 212, time of the initiation of the communication request 214 and/or the frequency or count 216 of the number of times a communication request has been received from the source identifier for the user has been received. In other implementations, fewer, additional, and/or different information may be maintained in the contact history data store 106. For example, the duration of each communication request, the agent involved in each communication request, notes entered by an agent, and/or results of the communication request may also be maintained in the contact history data store 106.

Figure 3:
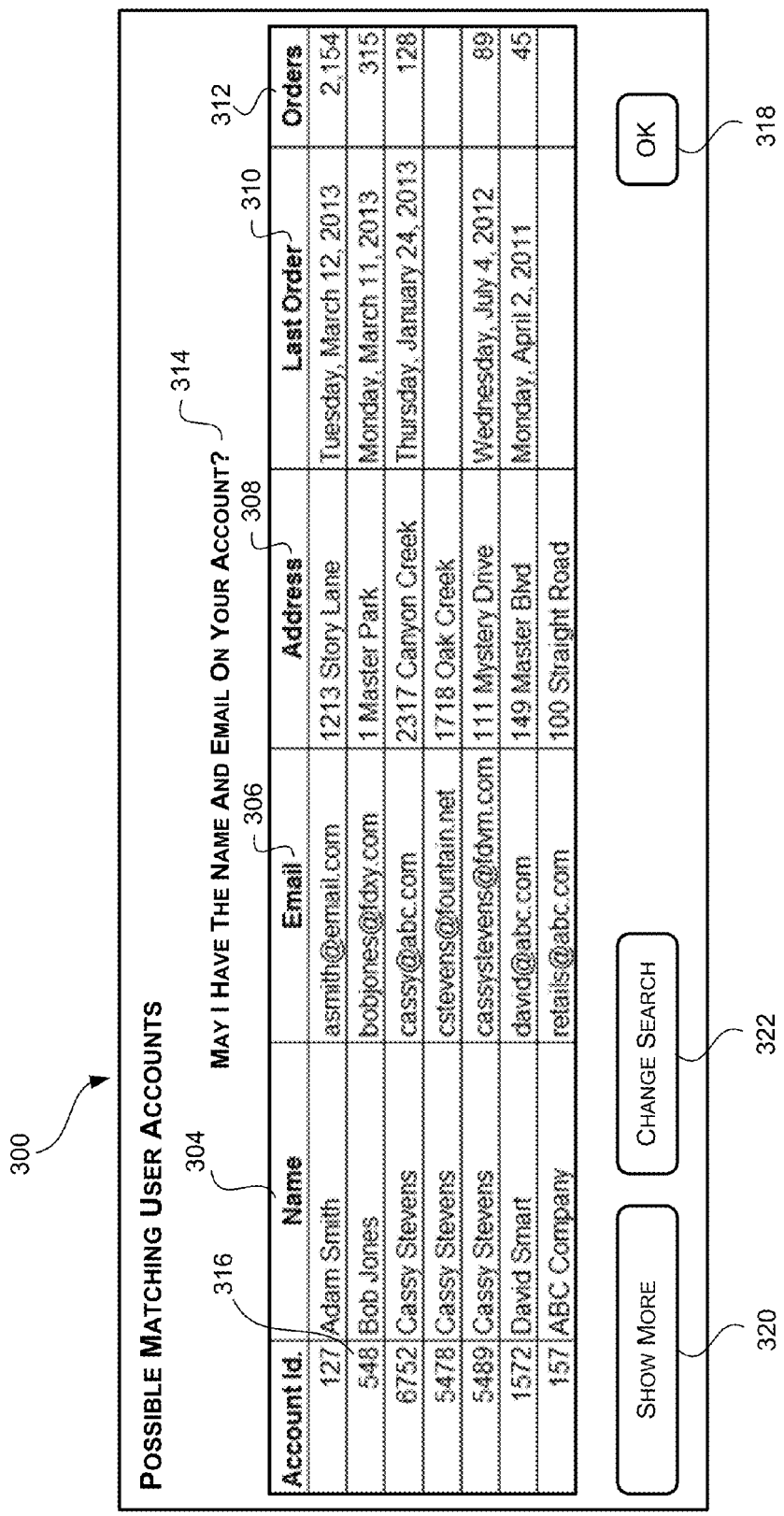
FIG. 3 is a block diagram illustrating a graphical user interface of possible matching user accounts, according to some implementations.

FIG. 3 is a block diagram illustrating a graphical user interface 300 of possible matching user accounts, according to some implementations. As illustrated in FIG. 3, once the contact management system 110 has identified potential user accounts (discussed below), the contact management system 110 may present to an agent a potential user account list 302. The agent 108 may utilize the information included in the potential user account list 302 to assist in identification and verification of the user that initiated the communication request. For example, the potential user account list 302 may identify the user name 304, email address 306, address 308, last order date 310 and/or number of orders 312 for each potential user account. The agent may then ask a verification question 314, such as "May I have the name and email on your account?" When the user provides the information, rather than the agent having to input it into the contact management system 110, the agent can review the account information provided for the potential user accounts and select the appropriate account. For example, if the user identifies themself as "Bob Jones" with an email address of "bobjones@fdxy.com" the agent can visually identify the appropriate user account based on the provided user account information. In this instance the agent 108 would select the user account 316 associated with the user Bob Jones and select the "OK" control 318.

Upon identifying the appropriate user account, the agent may be provided with additional user account information, such as order history, to assist in responding to the user. In some instances, the agent 108 may utilize some of the information to further verify the user. Once the identity of the user has been verified, the contact management system 110 may generate an association between the source identifier and the user account and store that information in the contact history data store 106.

If the agent 108 is not able to identify the appropriate user account based on the provided potential user account list, the agent 108 may select the "Show More" 320 control to view additional potential user accounts associated with the source identifier. As discussed further below, in some implementations, not all of the user accounts associated with the source identifier are initially displayed to the agent 108. Upon selecting the "Show More" 320 control, information for additional potential user accounts may be presented to the agent 108 via the user interface 300.

Likewise, the agent 108 may select to search for other user accounts by selecting the "Change Search" 322 control. Upon selecting the "Change Search" 322 control, the agent 108 may initiate a search for the user account using traditional techniques.

Figure 4:
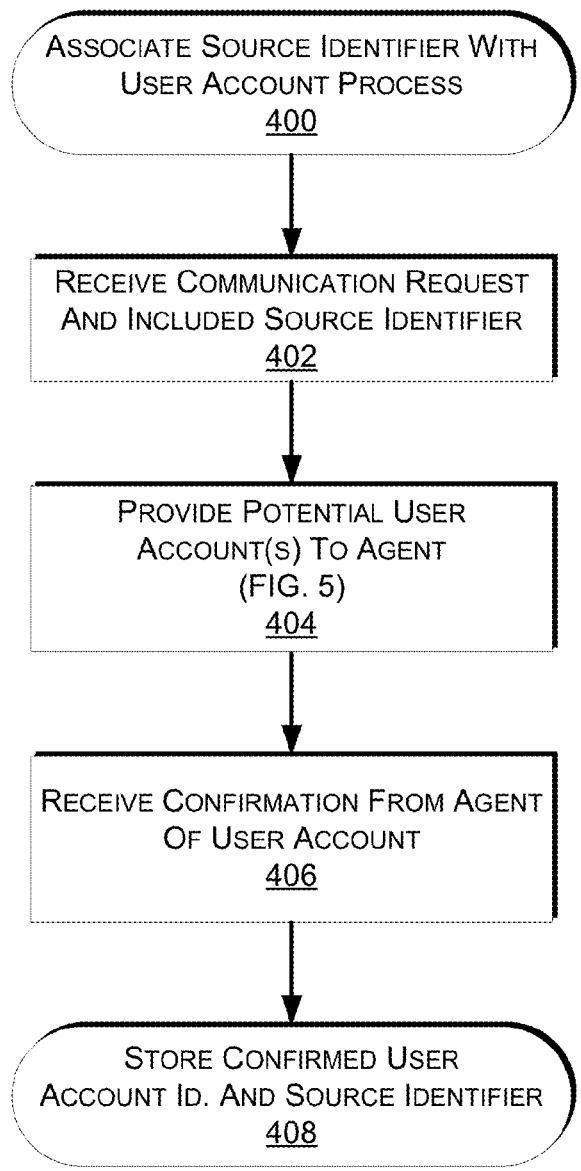
FIG. 4 depicts a flow diagram of a process for associating a source identifier with a user account, according to some implementations.

FIG. 4 depicts a flow diagram of a process 400 for associating a source identifier with a user account, according to some implementations. The process of FIG. 4 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins upon receipt of a communication request that includes a source identifier, as in 402. The communication request may be received from any communication source, such as a land-line telephone, cellular telephone, Voice-over-Internet-Protocol ("VoIP"), etc. For example, the contact management system 110 may provide a contact number (e.g., toll-free telephone number) that a user can dial to initiate a communication request with the contact management system 110. When the communication request is received, a source identifier is included. For example, many communication networks provide a source identifier (e.g., source telephone number) in the communication request. In other implementations, other forms of source identifiers may be included in the communication request. For example, the source identifier may be a coordinate location, or a range (e.g., 100 yards) associated with the coordinate location. In still other examples, the communication request may include multiple source identifiers. For example, the communication request may include both a telephone number and an IP address.

Upon receiving a communication request, one or more potential user account(s) that have been associated with the source identifier are provided to an agent, as in 404. Identification of potential user accounts is discussed in further detail below with respect to FIG. 5. The agent may then use the potential user account list to assist in identifying the user that initiated the communication request. For example, the agent may ask the user a series of questions and compare responses with information provided in the potential user account list to verify the identity of the user. If the user does not correspond with one of the user accounts, or if there were no potential user accounts identified for the source identifier, the agent may identify the user utilizing traditional techniques.

Once identified, the agent provides, and the process 400 receives, the identification of the user account of the user initiating the communication, as in 406. Upon receiving confirmation of the user account, and association between the source identifier and the confirmed user account is established and stored in the contact management data store, as in 408.

Figure 5:
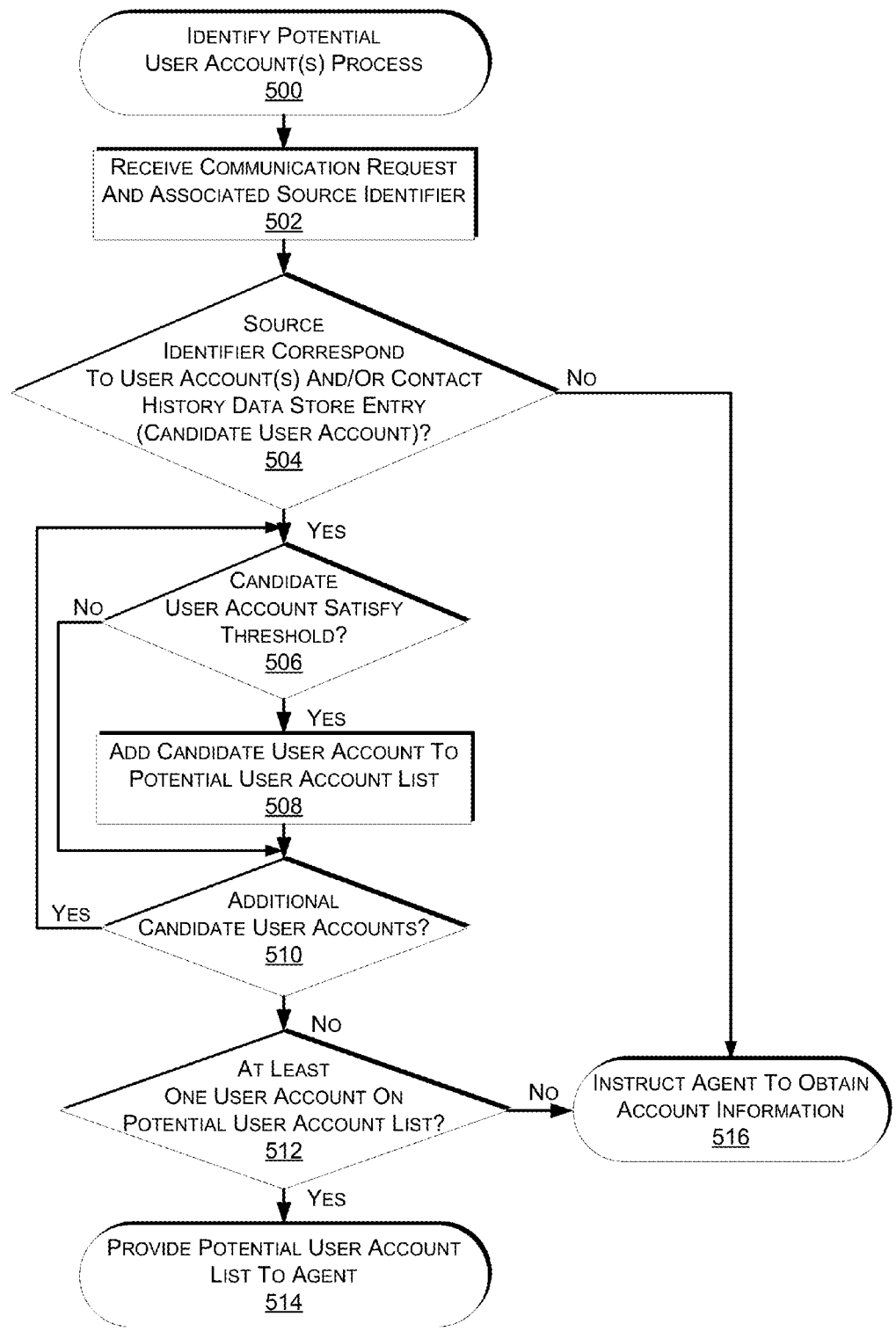
FIG. 5 depicts a flow diagram of a process for identifying potential user account(s), according to some implementations.

FIG. 5 depicts a flow diagram of a process 500 for identifying potential user account(s), according to some implementations. The example process 500 begins upon receipt of a communication request and an included source identifier, as in 502. Upon receiving a communication request with a source identifier, a determination is made as to whether the source identifier corresponds to a user account(s) and/or a contact history data store entry (collectively referred to herein as "candidate user account"), as in 504. A source identifier may be part of a user account if, for example, the user has identified the source identifier. For example, if a user provides the source identifier as a contact number, or other identifier that is included in the user account, that source identifier will be located and the user account identified. Likewise, as discussed above with respect to FIG. 4, once a user account is verified, it is associated with the source identifier and stored in the contact history data store.

The example process 500 may search both the user data store 104 and the contact history data store 106 for the source identifier and any corresponding accounts may be identified. In alternative embodiments, only the contact history data store may be searched.

If it is determined that the source identifier does correspond with one or more candidate user accounts, a determination is made for a candidate user account as to whether it satisfies a threshold. A threshold may be established to limit the number of potential user accounts identified to an agent to only those that have a higher probability of being the user account for the user that is initiating the communication request. For example, the threshold may be established such that only user accounts associated with a particular percentage of the communication requests from the source identifier satisfy the threshold. To illustrate, the threshold may be established such that 30% or more of the communication requests for the source identifier are associated with the user account. If there are one hundred prior communication requests from the source identifier, 50 of which are associated with user account A, 30 with user account B, and 20 with user account C, the threshold may only be satisfied for user accounts A and B.

It will be appreciated that the threshold may be any percentage or number. Likewise, the threshold may vary depending on the number of user accounts identified, the agent, and/or any other factor. In some implementations, the threshold may only be applied if there are over a defined number of candidate user accounts identified. For example, the threshold may only be applied if more than ten candidate user accounts are identified. In still other implementations, the threshold may be zero (or not applied at all) such that all candidate accounts satisfy the threshold.

In still other implementations, the count may be weighted. For example, when determining if the threshold has been satisfied, more recent communication requests may be given more weight than older communication request. Likewise, more recent user account activity may also be considered. For example, if user A has recently ordered and item, that user's account may be given more weight than another account that has had no recent activity.

If the candidate user account satisfies the threshold, it is added to a potential user account list, as in 508. Upon adding the user account to the potential user account list, or if it is determined that the candidate user account does not satisfy threshold, a determination is made as to whether additional candidate user accounts exist for consideration, as in 510. If there are additional candidate user accounts to consider, the example process 500 returns to block 506 and continues. However, if all candidate accounts have been considered, a determination is made as to whether at least one user account has been added to the potential user account list, as in 512.

If at least one user account has been included in the potential user account list, the potential user account list is provided to an agent, as in 514. However, if it is determined that no potential user accounts were identified and/or if it is determined at decision block 504 that there are no user accounts and/or contact history data store entries for the source identifier, the example process 500 may instruct the agent to obtain account information and verify the user utilizing traditional techniques, as in 516.

Figure 6:
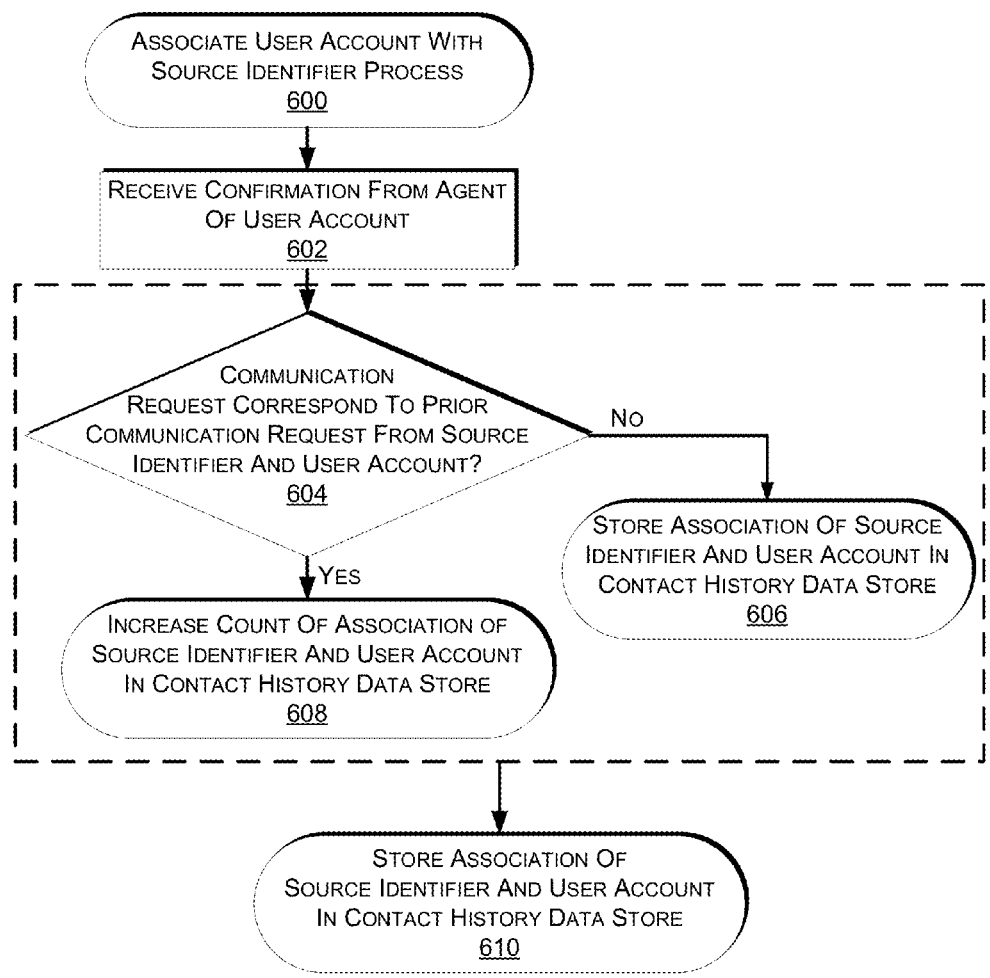
FIG. 6 depicts a flow diagram of a process for associating a user account with a source identifier, according to some implementations.

FIG. 6 depicts a flow diagram of a process 600 for associating a user account with a source identifier, according to some implementations. The example process 600 begins upon receiving a confirmation from an agent of a user account that corresponds with a user that initiated a communication request, as in 602. Upon receiving the confirmation, a determination is made as to whether the communication request corresponds with a prior communication request from the source identifier and user account, as in 604. If it is determined that the communication request does correspond with a prior communication request from the source identifier for the user account, a count of the association between the source identifier and the user account may be increased and stored in the contact history data store, as in 608. If it is determined that there is no prior stored association between the source identifier and the user account, the example process stores an association between the source identifier and the user account in the contact history data store, as in 606.

In an alternative implementation, rather than processing the blocks 604-608, the example process may simply store an association of the source identifier and user account in the contact history data store, as in 610. In such an implementation, rather than maintaining a count for the association, each time the same user account initiates a communication request from the same source identifier it is added to the contact history data store. When future communication requests are received from the source identifier each entry is identified and a count determined.

Figure 7:
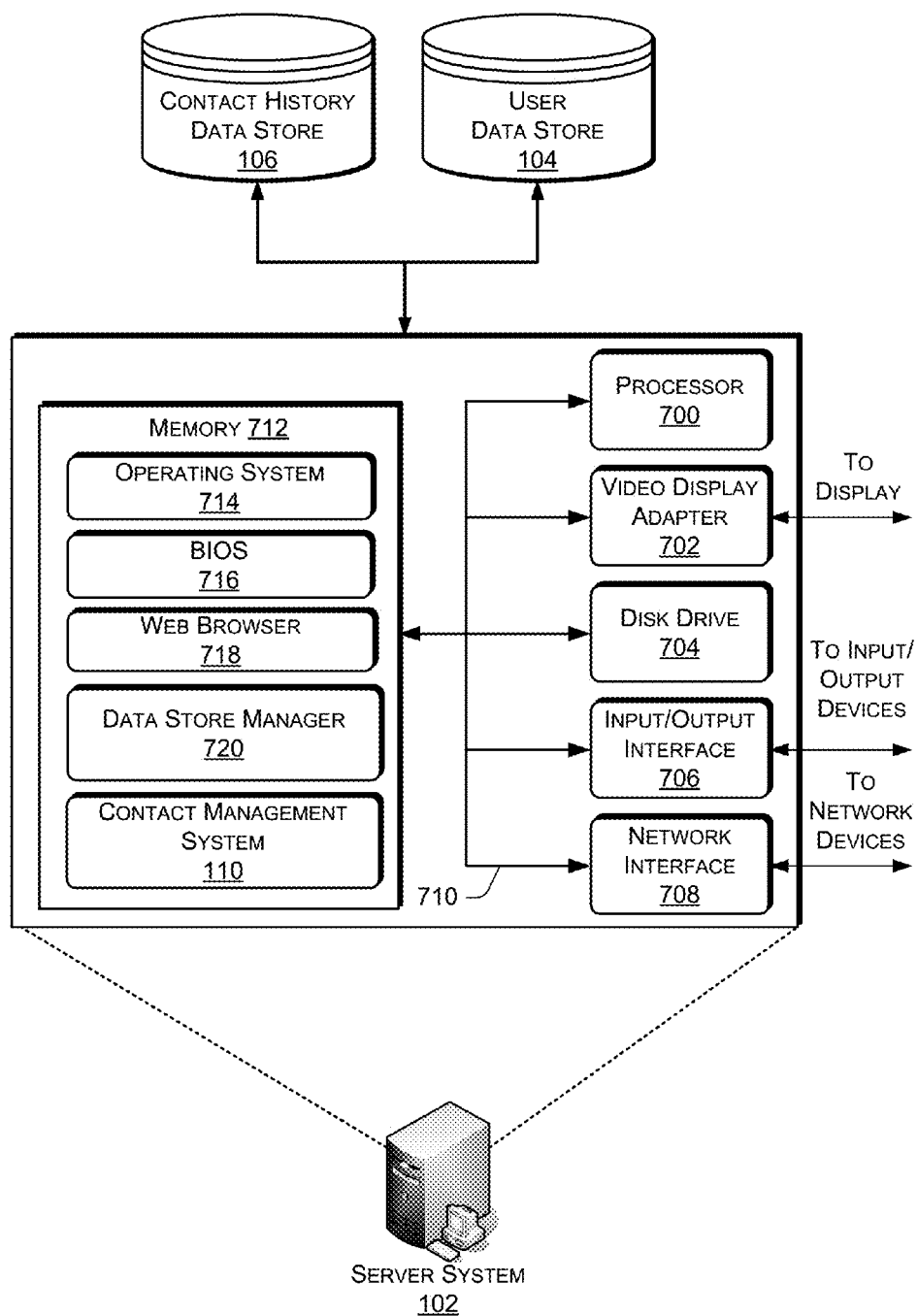
FIG. 7 is a block diagram of an illustrative implementation of a server system that may be used with various implementations.

FIG. 7 is a pictorial diagram of an illustrative implementation of a server system, such as the server system 102, that may be used in the implementations described herein. The server system 102 may include a processor 700, such as one or more redundant processors, a video display adapter 702, a disk drive 704, an input/output interface 706, a network interface 708, and a memory 712. The processor 700, the video display adapter 702, the disk drive 704, the input/output interface 706, the network interface 708, and the memory 712 may be communicatively coupled to each other by a communication bus 710.

The video display adapter 702 provides display signals to a local display (not shown in FIG. 7) permitting an operator of the server system 102 to monitor and configure operation of the server system 102. The input/output interface 706 likewise communicates with external input/output devices not shown in FIG. 7, such as a mouse, keyboard, scanner, or other input and output devices that can be operated by an operator of the server system 102. The network interface 708 includes hardware, software, or any combination thereof, to communicate with other computing devices. For example, the network interface 708 may be configured to provide communications between the server system 102 and other computing devices, such as an agents computing device and/or a user's computing device, as shown in FIG. 1.

The memory 712 generally comprises random access memory (RAM), read-only memory (ROM), flash memory, and/or other volatile or permanent memory. The memory 712 is shown storing an operating system 714 for controlling the operation of the server system 102. A binary input/output system (BIOS) 716 for controlling the low-level operation of the server system 102 is also stored in the memory 712.

The memory 712 additionally stores program code and data for providing network services that allow other computing devices to communicate with the contact management system 110. Accordingly, the memory 712 may store a browser application 718. The browser application 718 comprises computer executable instructions, that, when executed by the processor 700 generate or otherwise obtain configurable markup documents such as Web pages. The browser application 718 communicates with a data store manager application 720 to facilitate data exchange between the user data store 104 and the contact history data store 106.

As used herein, the term "data store" refers to any device or combination of devices capable of storing, accessing and retrieving data, which may include any combination and number of data servers, databases, data storage devices and data storage media, in any standard, distributed or clustered environment. The server system 102 can include any appropriate hardware and software for integrating with the data stores 104-106 as needed to execute aspects of one or more applications for the contact management system 110.

The data stores 104-106 can include several separate data tables, databases or other data storage mechanisms and media for storing data relating to a particular aspect. For example, the data stores 104-106 illustrated include mechanisms for user information, contact history information, etc. which can be used to generate and deliver information to agents 108 and/or users.

It should be understood that there can be many other aspects that may be stored in the data stores 104-106. The data stores 104-106 are operable, through logic associated therewith, to receive instructions from the server system 102 and obtain, update or otherwise process data in response thereto.

In addition to maintaining information about users and contact history, the contact history management system 110 may provide use information, such as contact history to the agents 108. For example, the contact history management system 110, through communication between the server system 102 and a computing device of an agent 108, may provide contact history information and/or user account information to an agent identifying potential user accounts of a user initiating a communication request.

The memory 712 may also include the contact history management system 110, discussed above. The contact history management system 110 may be executable by the processor 700 to implement one or more of the functions of the server system 102. In one implementation, the contact history management system 110 may represent instructions embodied in one or more software programs stored in the memory 712. In another implementation, the contact history management system 110 can represent hardware, software instructions, or a combination thereof.

The server system 102, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction in FIG. 7 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method for identifying a user account from source information, comprising:
   under control of one or more computing systems configured with executable instructions,
      receiving a communication request including:
         a source identifier having a coordinate location or a telephone number; and
         a request that a telephone call be initiated to the telephone number, wherein the communication request is initiated from a computing device, and wherein the source identifier of the communication request includes the telephone number for a device other than the computing device; and
      determining a plurality of potential user accounts based at least in part on:
         a source identifier of a verified prior communication request, wherein the verified prior communication request was previously verified as being associated with at least one of the potential user accounts based at least in part on a confirmation input by a human agent; and
         the coordinate location or the telephone number of the source identifier of the communication request; and
      providing based at least in part on the plurality of potential user accounts, a listing for display to a second human agent for selecting a user account associated with the communication request, wherein the listing includes:
         at least one potential user account of the plurality of the potential user accounts; and
         user account information for the at least one potential user account of the plurality of potential user accounts.

2. The computer-implemented method of claim 1, further comprising:
   determining that a plurality of prior communication requests have been received that include the source identifier; and
   determining that a percentage of the prior communication requests are associated with the at least one potential user account, wherein providing the listing for display to the second human agent is further based at least in part on the determination that the percentage of the prior communication requests are associated with the at least one potential user account.

3. The computer-implemented method of claim 2, wherein the percentage exceeds a threshold.

4. The computer-implemented method of claim 1, wherein the user account information of each potential user account includes a user name and at least one of a last order date, an address, or a number of orders.

5. The computer-implemented method of claim 1, wherein providing the listing is further based at least in part on one of:
   a date of the verified prior communication request; or
   an activity date associated with one of the potential user accounts.

6. The computer-implemented method of claim 1, wherein providing the listing is further based at least in part on a count of a number of associations between the source identifier and one of the potential user accounts of the plurality of potential user accounts.

7. A computing system comprising:
   one or more processors; and
   a memory coupled to the one or more processors and storing program instructions that when executed by the one or more processors cause the one or more processors to at least:
      receive a communication request, the communication request including a source identifier, wherein the source identifier comprises at least one of a coordinate location or a telephone number, and wherein the communication request includes a request that a telephone call be initiated to the telephone number, wherein the communication request is initiated from a computing device, and wherein the source identifier of the communication request includes the telephone number for a device other than the computing device;

identify a user account associated with the source identifier, wherein the user account is associated with the source identifier based at least in part on a prior communication request including the source identifier;

verify the source identifier as being associated with the user account based at least in part on a confirmation input by a human agent; and provide user account information of the user account to a second human agent.

8. The computing system of claim 7, the program instructions that when executed by the one or more processors further cause the one or more processors to at least associate the user account with the source identifier in response to receiving a confirmation by the second human agent that the user account corresponds to a user initiating the communication request.

9. The computing system of claim 7, wherein the user account information is provided in a potential user account list.

10. The computing system of claim 9, wherein the potential user account list includes user account information of a plurality of user accounts.

11. The computing system of claim 7, the program instructions that when executed by the one or more processors further cause the one or more processors to:

determine if a count of prior communication requests including the source identifier and associated with the user account exceeds a threshold.

12. The computing system of claim 11, the program instructions that when executed by the one or more processors further cause the one or more processors to:

based at least in part on a determination that the threshold has been exceeded, including the user account on a potential user account list; and wherein the user account information of the user account is provided to the second human agent as part of the potential user account list.

13. The computing system of claim 11, wherein the threshold is:

a percentage of prior communication requests including the source identifier and associated with the user account; or a number of prior communication requests including the source identifier and associated with the user account.

14. The computing system of claim 7, wherein account information corresponding to a plurality of user accounts is provided to the second human agent.

15. The computing system of claim 14, wherein each of the plurality of user accounts includes an association with the source identifier.

16. A method for identifying a user account from source information of a communication request, the method comprising:

under control of one or more computing devices configured with executable instructions, receiving a communication request including a source identifier, wherein the source identifier comprises at least one of a coordinate location or a telephone number, and wherein the communication request includes a request that a telephone call be initiated to the telephone number;

identifying a user account of a user initiating the communication request based at least in part on a verified prior communication request that includes the source identifier, wherein the verified prior communication request was previously verified as being associated with the user account based at least in part on a confirmation input by a human agent;

providing user account information of the user account to a second human agent;

associating the source identifier and the user account; and storing the association of the source identifier and the user account.

17. The method of claim 16, wherein identifying a user account further comprises:

associating the source identifier and the user account subsequent to receiving a confirmation input from the second human agent.

18. The method of claim 17, wherein the confirmation input from the second human agent is received subsequent to the second human agent verifying an identity of a user initiating the communication request.

19. The method of claim 16, wherein storing the association of the source identifier and the user account includes:

determining that the association of the source identifier and the user account has previously been stored; and increasing a count indicative of a number of associations between the source identifier and the user account that has previously been stored.

20. The method of claim 16, wherein storing the association of the source identifier and the user account includes:

modifying a list of associations between source identifiers and user accounts.

21. The method of claim 16, wherein the communication request is initiated from a computing device, and wherein the source identifier of the communication request includes the telephone number for a device other than the computing device.

* * * * *